United States Patent [19]

Ortega et al.

[11] Patent Number: 4,661,159

[45] Date of Patent: Apr. 28, 1987

[54] CEMENTITIOUS FLOOR UNDERLAYMENT

[76] Inventors: Raymond Ortega, 2931 Fontana; Jesse F. Ortega, 3006 Shadowdale, both of Houston, Tex. 77043

[21] Appl. No.: 797,584

[22] Filed: Nov. 13, 1985

[51] Int. Cl.$^4$ .......................... C04B 7/02; C04B 11/00
[52] U.S. Cl. ......................................... 106/89; 106/110
[58] Field of Search .................................. 106/89, 110

[56] References Cited

U.S. PATENT DOCUMENTS

| | | | |
|---|---|---|---|
| 2,341,426 | 2/1944 | Dailey | 106/110 |
| 2,791,511 | 5/1957 | Nutley et al. | 106/109 |
| 3,582,376 | 1/1971 | Ames | 106/110 |
| 3,645,750 | 2/1972 | Sadran | 106/104 |
| 4,067,939 | 1/1978 | Lowe et al. | 264/42 |
| 4,075,374 | 2/1978 | Jorgenson et al. | 427/355 |
| 4,353,748 | 10/1982 | Birchall et al. | 106/89 |

FOREIGN PATENT DOCUMENTS

| | | | |
|---|---|---|---|
| 2430683 | 1/1976 | Fed. Rep. of Germany | 106/110 |
| 53-79924 | 7/1978 | Japan | 106/110 |
| 54-141818 | 11/1979 | Japan | 106/89 |

OTHER PUBLICATIONS

"A Ready Mixed Concrete Company's Experience with Fly Ash," James E. Cook, May 1980.

"Environmental Protection Agency Guideline for Federal Procurement of Cement and Concrete Containing Fly Ash." 48 Federal Register 20, Jan. 28, 1983.

*Primary Examiner*—William R. Dixon, Jr.
*Assistant Examiner*—Steven Capella
*Attorney, Agent, or Firm*—Fulbright & Jaworski

[57] ABSTRACT

A floor underlayment composition for producing a fluid, quick-setting cementitious underlayment which includes alpha gypsum, beta gypsum, fly ash, and Portland cement.

8 Claims, No Drawings

CEMENTITIOUS FLOOR UNDERLAYMENT

BACKGROUND OF THE INVENTION

1. Field of the Invention

The present invention is directed to cementitious compositions and relates particularly to a cementitious floor underlayment that includes an alpha calcium sulfate hemihydrate, Portland cement, fly ash, and a beta calcium sulfate hemihydrate.

2. Description of the Prior Art

The scope and content of the prior art related to the present floor underlayment is very broad. It includes the prior art directed to forms of gypsum, plaster, cement and concrete as these are used in construction, insulation, fireproofing, roadwork, pottery, molding, flooring, roofing, wall installation, sealing; as well as methods and apparatuses related to these. We are aware of the following prior art in these areas:

| | | | | |
|---|---|---|---|---|
| 499,170 | 2,337,523 | 2,682,515 | 3,874,887 | 3,808,299 |
| 581,466 | 2,347,233 | 2,690,975 | 3,179,528 | 3,852,081 |
| 933,036 | 2,494,295 | 2,705,223 | 3,232,778 | 3,869,018 |
| 1,558,783 | 3,025,176 | 2,753,608 | 3,427,374 | 3,895,018 |
| 1,705,088 | 3,093,505 | 2,791,511 | 3,450,548 | 3,957,522 |
| 1,901,056 | 3,917,489 | 2,798,003 | 3,547,840 | 4,030,939 |
| 1,923,370 | 2,512,996 | 2,859,530 | 3,582,376 | 4,045,237 |
| 2,078,289 | 2,533,263 | 2,882,175 | 3,623,898 | 4,067,939 |
| 2,172,076 | 2,602,785 | 2,914,413 | 3,645,750 | 4,038,044 |
| 2,310,023 | 2,681,863 | 3,873,332 | 3,770,859 | 4,353,748 |
| | | | | 4,304,704 |

The prior art also includes "DURACAL which can do what no cement has ever done," brochure of U.S. Gypsum, 1981; "GYP-CRETE Poured Gypsum Floor Underlayment," brochure of Gyp-Crete Corporation, 1981; and the disclosure of our previous applications: Ser. No. 489,015, filed Apr. 27, 1983; and Ser. No. 655,335, filed Sept. 27, 1984.

Of the prior art we have listed, we consider the following as pertinent to our invention: U.S. application Ser. No. 489,015; U.S. application Ser. No. 655,355; U.S. Pat. Nos 4,067,939; 4,075,374; 3,645,750; 3,582,376; 4,353,748; 2,791,511; "A Ready Mix Concrete Company's Experience With Fly Ash," by James E. Cook; E.P.A. "Guidelines For Federal Procurement Of Cement and Concrete Containing Fly Ash," Federal Register, Vol. 48, No. 20, Jan. 28, 1983. None of them taken alone or in any possible combination teaches or suggests our new composition of matter.

For five years we have worked to perfect the unique quick-setting composition which we claim here as our invention. The level of skill of a person of ordinary skill in the art pertinent to this invention is that of a person with familiarity with plasters, gypsums, and cements and various additives for them who has had extensive actual experience formulating them in various combinations to solve problems related to quick-setting compositions of matter.

SUMMARY OF THE INVENTION

Our invention is a new, useful, and unobvious combination of a variety of ingredients to form a composition of matter which is quick-setting, non-combustible, non-water-permeable, easy to work with, strong, sound insulating, lightweight, and economical. This composition includes as primary ingredients an alpha calcium sulfate hemihydrate, a Portland cement, fly ash, and a beta calcium sulfate hemihydrate.

Our invention is broad enough to include within its scope combinations of the primary ingredients and small amounts of retarders, defoamers, and superplasticizers. The composition is mixed with desired amounts of water and sand or other aggregate to produce a pourable, sprayable, or pumpable slurry-type mixture.

It is therefore an object of our invention to provide a unique composition of matter for producing a fluid, quick-setting, self-levelling, cementitious floor underlayment.

A further object of our invention is the provision of a floor underlayment which is non-water permeable, strong, and sound insulative.

Another object of the present invention is the provision of a cementitious composition which is non-combustible and which, once in place, creates a monolithic seal to reduce the effects of fires.

Yet another object of our invention is the provision of a new floor underlayment material which can be used with water and sand or other aggregate to form a mixture which is fluid, pourable manually, or pumpable by machine.

An additional object of our invention is the provision of a novel floor underlayment material which can be used with water and sand or other aggregate to produce a fluid mixture which when applied to a substrate or introduced into a container or mold is self-levelling.

A particular object of the present invention is the provision of a floor underlayment material which can be used with water to form a fluid which, although it is pourable or pumpable, has sufficient body so that it can be worked with easily without undue splattering on personnel or objects nearby.

A further object of the present invention is the provision of a floor underlayment material which can be mixed with water to form a fluid mixture from which water will not run out as the mixture sets.

Other and further objects, features, and advantages are disclosed in the following description of the presently preferred embodiments of the invention given for the purpose of disclosure.

DESCRIPTION OF PREFERRED EMBODIMENTS

Although the claims appended hereto are entitled to a range and scope of equivalents beyond the specific description of the preferred embodiments to be set forth here, these preferred embodiments are given here for the purpose of satisfying the statutory requirements of disclosure of § 112, Title 35, United States Code.

The composition of matter according to the present invention includes four primary ingredients, each of which individually is known to the prior art and is commercially available: (1) an alpha gypsum (also known as alpha calcium sulfate hemihydrate), (2) a Portland cement; (3) fly ash; and (4) a beta gypsum (also known as beta calcium sulfate hemihydrate). Other additives such as defoamers, retarders, and plasticizers can be added.

The preferred alpha gypsum is U.S. Gypsum's commercially available "Statuary Hydrocal Cement" because of its consistency and plasticity. A sample of this cement had 86.1% calcium sulfate hemihydrate and 11.7% calcium sulfate. The preferred Portland cement is conventional commercially available Type II Portland cement, but other types such as Type V will work in our invention.

Moulding plaster is a beta gypsum which is also commonly known as "Plaster of Paris." It is partially dehydrated gypsum. It has a chemical formula of $CaSO_4.\frac{1}{2} H_2O$. The preferred beta gypsum is commercially available U.S. Gypsum No. 1 Moulding Plaster.

"Fly ash" is a component of coal which results from the combustion of coal and is the finely divided mineral residue which is typically collected from boiler stack gases by an electrostatic precipitator or mechanical collection device.

In the primary composition it is preferred that the beta gypsum be present in the range of about 45%–55% by weight; alpha gypsum in the range of about 20% to 30% by weight; about 5% fly ash by weight; and about 20% Type II Portland Cement by weight.

The preferred retarder is sodium citrate (in the ratio of 3 pounds retarder to 4,000 pounds of the primary composition) because it can be used very effectively in small amounts as compared to other retarders without adversely affecting desired characteristics of the composition. None of the prior art teaches or supports the use of sodium citrate as a retarder for our new composition.

Various conventional anti-foam agents can be used as desired with the composition of matter of the present invention. The preferred defoamer is "Colloid 775DD" present in the ratio of 3.25 pounds of defoamer to 4,000 pounds of the primary composition by weight. It is produced by North Chemical Company. This defoamer is preferred because it reduces air entrapment without adversely affecting other characteristics of the composition. Another commercially available defoamer of which we are aware that can be used is Diamond Shamrock's "Nopco PD 1."

The preferred superplasticizers are either Diamond Shamrock's "Lomar D" present in the ratio of 30 pounds of Lomar D to 4,000 pounds of primary composition or American Admixtures and Chemicals Corporation's "Melment" present in the same amount. These superplasticizers reduce water content and increase fluidity.

The water content for a mixture using our composition is in the range of about 30% to about 70% by weight as compared to the total amount of primary composition plus water. The amount of water used is dependent upon the humidity of the environment and of the ingredients as well as the particular application.

We are unaware of the mechanisms or reactions which take place either within our composition itself or where our composition is mixed with water and sand or other aggregates, but we do know that the results achieved are unexpected and significantly better than any other composition of which we are aware.

Comparison of Claimed Subject Matter to Prior Art

Prior art underlayments for floors have many disadvantages and problems associated with them. These problems include (1) they are relatively soft and have a relatively low and also inconsistent compressive strength; (2) they are water permeable; (3) upon drying a dusty surface is formed on them; (4) upon exposure to adverse weathering they deteriorate or delaminate; (5) their densities often do not meet requirements; and (6) they cannot withstand relatively heavy weight.

There are many well-known problems associated with conventional lightweight concrete, including particularly its water-absorptive nature which renders it susceptible to cracking and deterioration due to freeze/thaw action. Also, a relatively larger amount of such concrete is required to produce the same insulative effects produced by a lesser amount of our new composition.

Typical Installation

In a typical use of our new composition for flooring, the room in which the flooring will be installed has a conventional plywood subfloor. The flooring underlayment mixture, which has been mixed with conventional mixing means, is pumped through a hose to the room where the flooring underlayment is to be applied.

One worker can hold the hose over the floor and insure that the underlayment is applied to the desired depth. A typical bedroom can be done in about five minutes. Once the mixture has been applied it is allowed to set, and, usually within one hour the set is nearly complete. Within two hours, the floor can be walked on without damage as compared to prior art concrete floorings that require at least a day to set to the point where other workers and craftsmen can walk on them.

About 4500 square feet per hour of the underlayment of the present invention can be installed whereas only about 2000 square feet of prior art concrete floorings can be installed in an hour.

A typical mixture for this type of interior room floor includes:
  75 lbs of our new composition
  3 cubic feet of sand
  4 to 8 gallons of water (depending on moisture content of the sand)

If the sand is wet, it is best to delete one to two gallons of water and then add water as needed.

While we have described preferred embodiments of our invention, various changes and modifications may be made therein without departing from the spirit of the invention and the proper scope of equivalents of the following claims.

We claim as our invention:

1. A floor underlayment composition including beta gypsum, alpha gypsum, Portland cement and fly ash; the beta gypsum present in the range of about 45% to 55% of the total dry weight of the composition; the alpha gypsum present in the range of about 20% to 30% of the total dry weight of the composition; the Portland cement present as about 20% of the total dry weight of the composition; and the fly ash present as about 5% of the total dry weight of the composition.

2. The composition of claim 1 including also water present in the range of about 30% to about 70% by weight as compared to the total weight of water and dry ingredients.

3. The composition of claim 2 including also an amount of coarse aggregate.

4. The composition of claim 1 including also a retarder.

5. The composition of claim 4 wherein the retarder is sodium citrate.

6. The composition of claim 1 including a superplasticizer.

7. The composition of claim 1 including a defoamer.

8. The composition of claim 1 wherein the Portland cement is Type II Portland cement.

* * * * *